(12) United States Patent
Chavira et al.

(10) Patent No.: US 11,447,270 B2
(45) Date of Patent: Sep. 20, 2022

(54) TRACK FILLER AND METHODS FOR INSTALLING THE TRACK FILLER

(71) Applicant: The Boeing Company, Chicago, IL (US)

(72) Inventors: Isaac Anthony Chavira, Lake Stevens, WA (US); Michael Alexander Szoke, Mukilteo, WA (US); Dana Stephen Klein, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/908,602

(22) Filed: Jun. 22, 2020

(65) Prior Publication Data

US 2021/0394931 A1     Dec. 23, 2021

(51) Int. Cl.
    *B64F 5/10*     (2017.01)
    *B64D 11/06*    (2006.01)

(52) U.S. Cl.
    CPC ............ *B64F 5/10* (2017.01); *B64D 11/0696* (2013.01)

(58) Field of Classification Search
    CPC  B60N 2/0715; B60N 2/0725; B64D 11/0696; H02G 3/045
    See application file for complete search history.

(56) References Cited

U.S. PATENT DOCUMENTS

| | | | | |
|---|---|---|---|---|
| 4,927,201 A | * | 5/1990 | Froutzis | B60N 2/01508 248/503.1 |
| 6,143,984 A | * | 11/2000 | Auteri | H02G 3/0608 174/101 |
| 7,093,997 B2 | * | 8/2006 | Ferris | G02B 6/4439 403/387 |
| 7,191,981 B2 | * | 3/2007 | Laib | B64D 11/0696 244/118.6 |

(Continued)

FOREIGN PATENT DOCUMENTS

| | | | | |
|---|---|---|---|---|
| DE | 19947148 A1 | * | 4/2001 | ........... B60N 2/0725 |
| FR | 2832260 A1 | * | 5/2003 | ........... H02G 3/0608 |

(Continued)

OTHER PUBLICATIONS

DE-19947148-A1 machine translation (Year: 2001).*

(Continued)

*Primary Examiner* — Jacob J Cigna
*Assistant Examiner* — Michael W Hotchkiss
(74) *Attorney, Agent, or Firm* — Haynes and Boone, LLP

(57) ABSTRACT

A track filler may include an elongated body. The body may include a first sidewall having a first top end and a first bottom end, and formed along a first side of the body, a second sidewall having a second top end and a second bottom end, and formed along a second side of the body, opposite the first sidewall, and a topwall joining the first top end and the second top end. The body may form at least a partially hollow interior portion, and may also include a plurality of periodic notches along the first bottom end of the (Continued)

first sidewall and the second bottom end of the second sidewall and extending toward the first top end and the second top end, respectively. The body may also include a plurality of periodic grooves extending partially through the topwall, wherein each of the grooves extend from a notch at the first top end to a corresponding notch at the second top end.

20 Claims, 6 Drawing Sheets

(56) References Cited

U.S. PATENT DOCUMENTS

| | | | | |
|---|---|---|---|---|
| 9,071,041 | B2* | 6/2015 | Sayres | H02G 3/32 |
| 9,248,911 | B2* | 2/2016 | Köhn | B60N 2/0725 |
| 9,399,413 | B2* | 7/2016 | Phinney | B60N 2/0725 |
| 9,481,467 | B2* | 11/2016 | Oleson | B64C 1/20 |
| 9,592,903 | B2* | 3/2017 | Wottke | B64D 11/06 |
| 10,023,316 | B2* | 7/2018 | Neville | B64D 11/0624 |
| 10,336,457 | B2* | 7/2019 | Fritz | B60N 2/01525 |
| 10,450,073 | B2* | 10/2019 | Schulz | B64C 1/20 |
| 11,124,302 | B2* | 9/2021 | Daouk | B64D 9/003 |
| 2002/0096606 | A1* | 7/2002 | Bernard | H02G 3/0608 248/68.1 |
| 2006/0097109 | A1* | 5/2006 | Laib | B64D 11/0696 244/118.6 |
| 2006/0102784 | A1* | 5/2006 | Callahan | B64D 11/0696 244/118.6 |
| 2011/0115246 | A1* | 5/2011 | Beyer | B60N 2/773 296/24.34 |
| 2014/0349042 | A1* | 11/2014 | Schomacker | B64D 11/0696 428/34.1 |
| 2015/0145298 | A1* | 5/2015 | Wottke | B64D 11/0696 297/243 |
| 2017/0259706 | A1* | 9/2017 | Supernavage | B60N 2/0843 |
| 2019/0061566 | A1* | 2/2019 | Tsuji | B60N 2/0722 |
| 2019/0308526 | A1* | 10/2019 | Gross | B64D 11/0696 |
| 2019/0308670 | A1* | 10/2019 | Schulz | B62D 27/02 |
| 2020/0282869 | A1* | 9/2020 | Tuffs | B60N 2/0732 |

FOREIGN PATENT DOCUMENTS

| | | | | |
|---|---|---|---|---|
| KR | 101801110 B1 | * | 11/2017 | |
| WO | WO-1999052189 A1 | * | 10/1999 | H02G 3/045 |
| WO | WO-1999052190 A1 | * | 10/1999 | H02G 3/045 |

OTHER PUBLICATIONS

WO-1999052189-A1 machine translation (Year: 1999).*
WO-1999052190-A1 machine translation (Year: 1999).*
FR-2832260-A1 machine translation (Year: 2003).*
KR-101801110-B1 Machine Translation (Year: 2017).*

* cited by examiner

*FIG. 11*
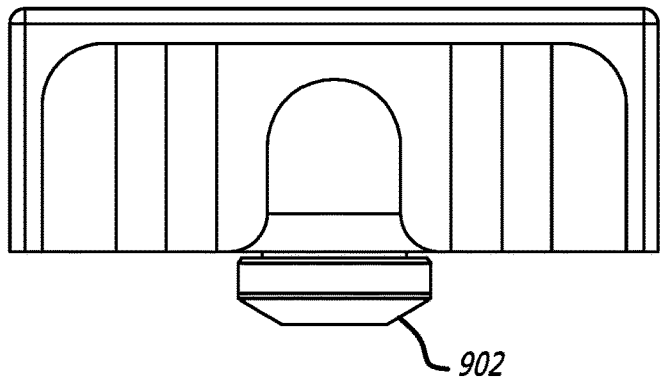
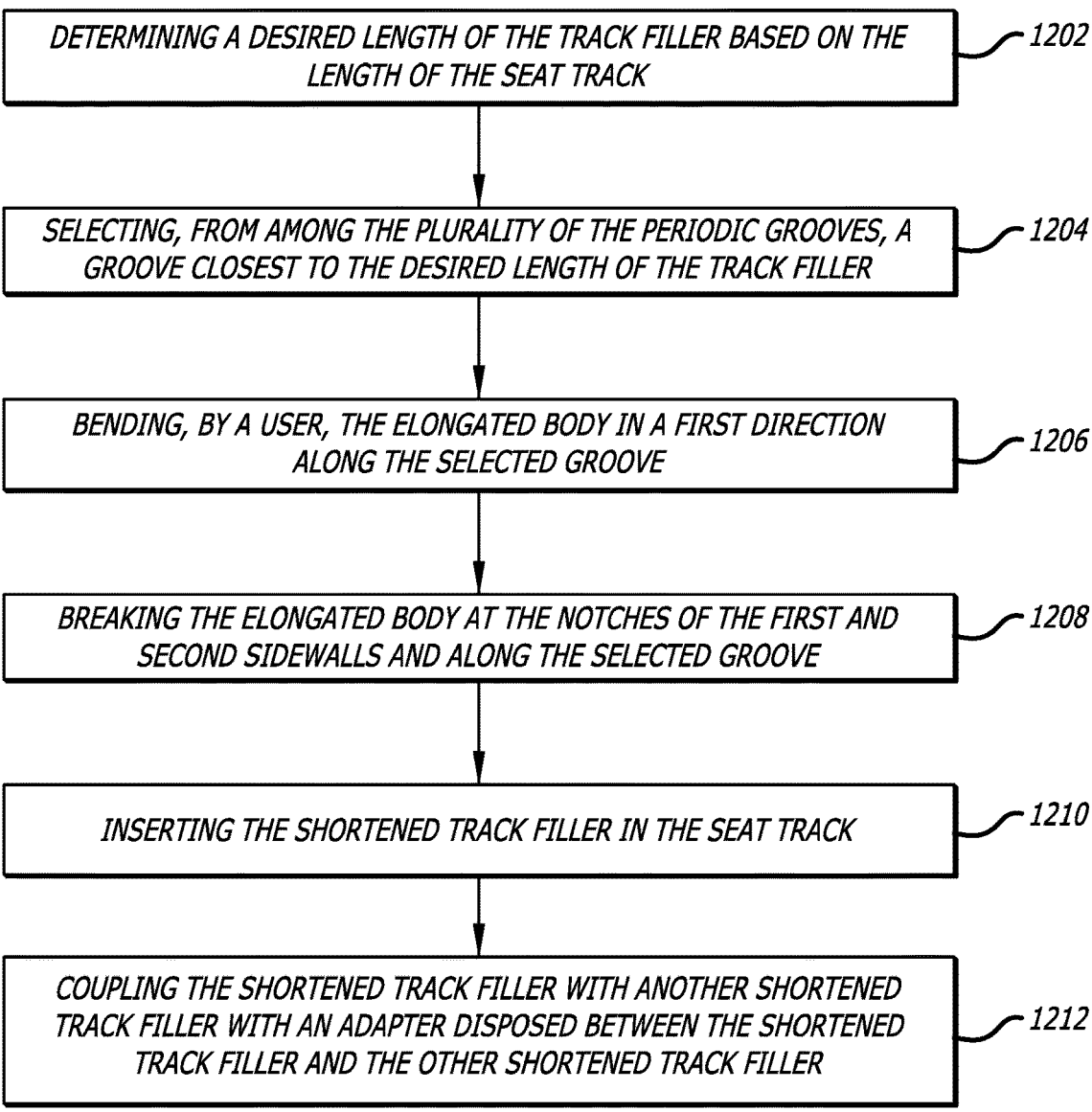
*FIG. 12*

TRACK FILLER AND METHODS FOR INSTALLING THE TRACK FILLER

TECHNICAL FIELD

The present application generally relates to toolless sizing of track fillers. More particularly, it relates to track fillers and methods for installing the track filler.

BACKGROUND

Certain aircraft furniture, for example, passenger seats on airplanes may be installed in tracks or rails (sometimes referred to as "seat tracks") because they provide airplane manufacturers flexibility with configuration and installation of the seats. For example, different customers may desire different spacing between the seats, and the seats can come in various sizes and shapes. Thus, by providing tracks on the floor of the aircraft cabin, the seats may be installed anywhere along the track without having to drill holes at specific locations within the floor. This is also convenient should the customer desire to change the configuration or arrangement of the seats at a later time, the existing seats can be removed, and new seats may be installed in any new desired arrangement along the track without having to drills new holes in the floor.

SUMMARY

According to a first example, a track filler, is described. The track filler may include: an elongated body including: a first sidewall having a first top end and a first bottom end, and formed along a first side of the body; a second sidewall having a second top end and a second bottom end, and formed along a second side of the body, opposite the first sidewall; and a topwall joining the first top end and the second top end, wherein the body forms at least a partially hollow interior portion. The elongated body may include a plurality of periodic notches along the first bottom end of the first sidewall and the second bottom end of the second sidewall and extending toward the first top end and the second top end, respectively; and a plurality of periodic grooves extending partially through the topwall, wherein each of the grooves extend from a notch at the first top end to a corresponding notch at the second top end.

According to a second example, a method for installing the track filler in the seat track is described. The method may include: determining a desired length of the track filler based on the length of the seat track; selecting, from among the plurality of the periodic grooves, a groove closest to the desired length of the track filler; bending, by a user, the elongated body in a first direction along the selected groove; breaking the elongated body at the notches of the first and second sidewalls and along the selected groove; and inserting the shortened track filler in the seat track.

The scope of the invention is defined by the claims, which are incorporated into this section by reference. A more complete understanding of examples of the invention will be afforded to those skilled in the art, as well as a realization of additional advantages thereof, by a consideration of the following detailed description of one or more examples. Reference will be made to the appended sheets of drawings that will first be described briefly.

BRIEF DESCRIPTION OF THE DRAWINGS

FIGS. 9-11 illustrate a track filler coupled to another track filler by an adapter disposed between the two track fillers, according to various examples of the present disclosure.

FIG. 12 is a flow chart of a method for installing the track filler, according to various examples of the present disclosure.

Figure 1:
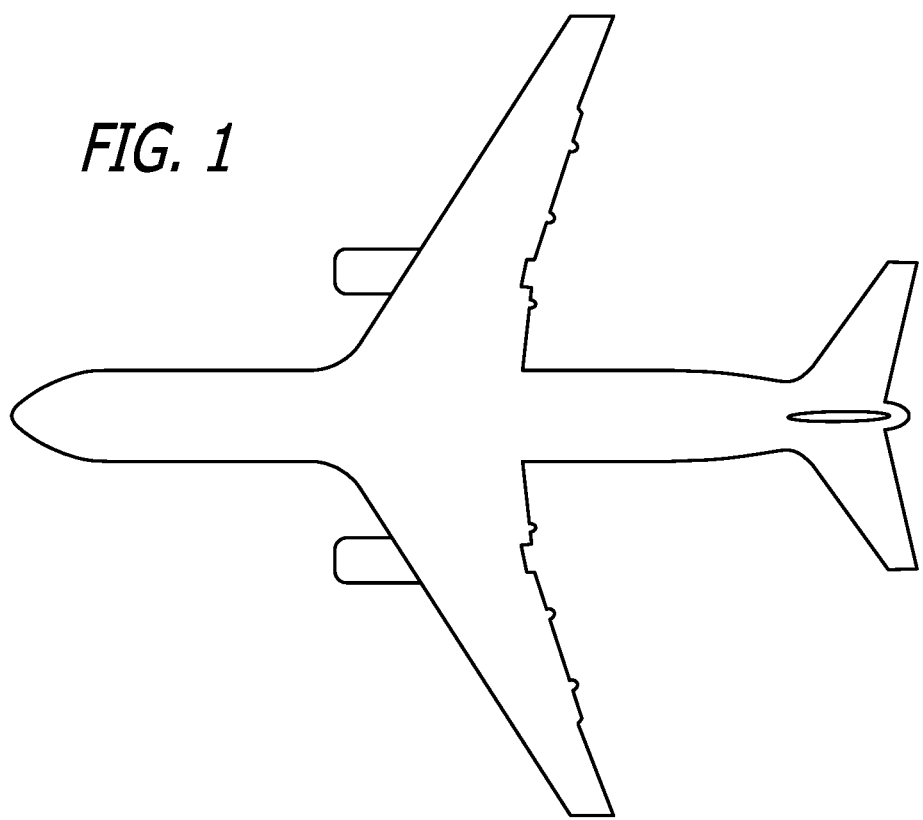
FIG. 1 is an illustration of an example aircraft that utilizes tracks for installation and mounting of seats.

Examples of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Hereinafter, various examples will be described in more detail with reference to the accompanying drawings. The present invention, however, may be embodied in various different forms, and should not be construed as being limited to only the illustrated embodiments herein. Rather, these examples are provided so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

FIG. 1 illustrates an example aircraft that utilizes tracks for installation and mounting of seats. The aircraft may be a commercial or military aircraft that is typically large enough to accommodate passengers, thus having passenger seats in the cabin of the aircraft. Some aircraft may have seats along both sides of the cabin with an aisle down the middle, whereas some larger widebody aircraft may have an additional section of seats in the middle of the cabin with two aisles, e.g., one aisle between the middle section and a first side of the aircraft and the other aisle between the middle section and a second side of the aircraft. Accordingly, the number of tracks in the cabin may vary based on the size of the aircraft.

Figure 2:
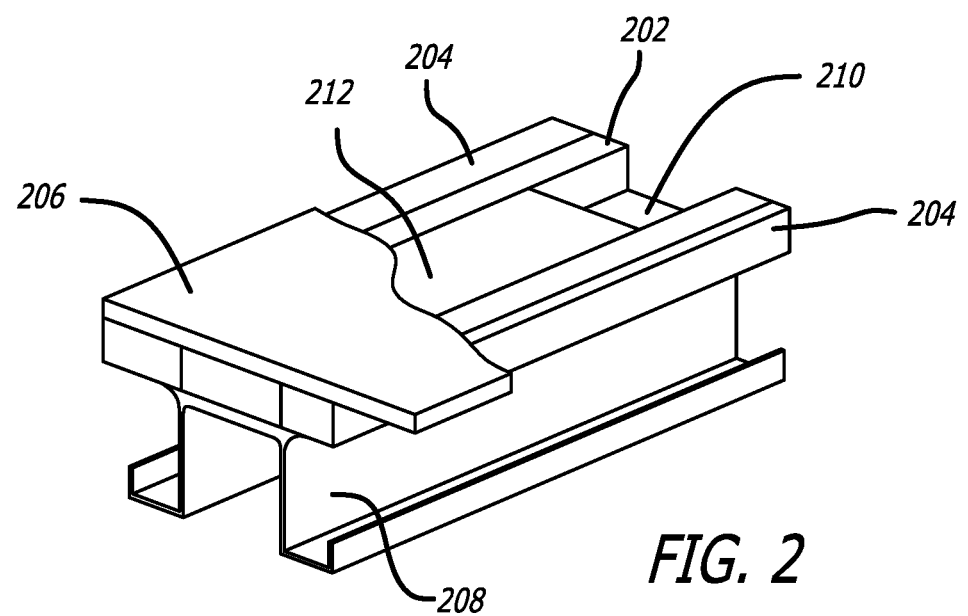
FIG. 2 illustrates a perspective view of an example track installed in an aircraft cabin.
Figure 3:
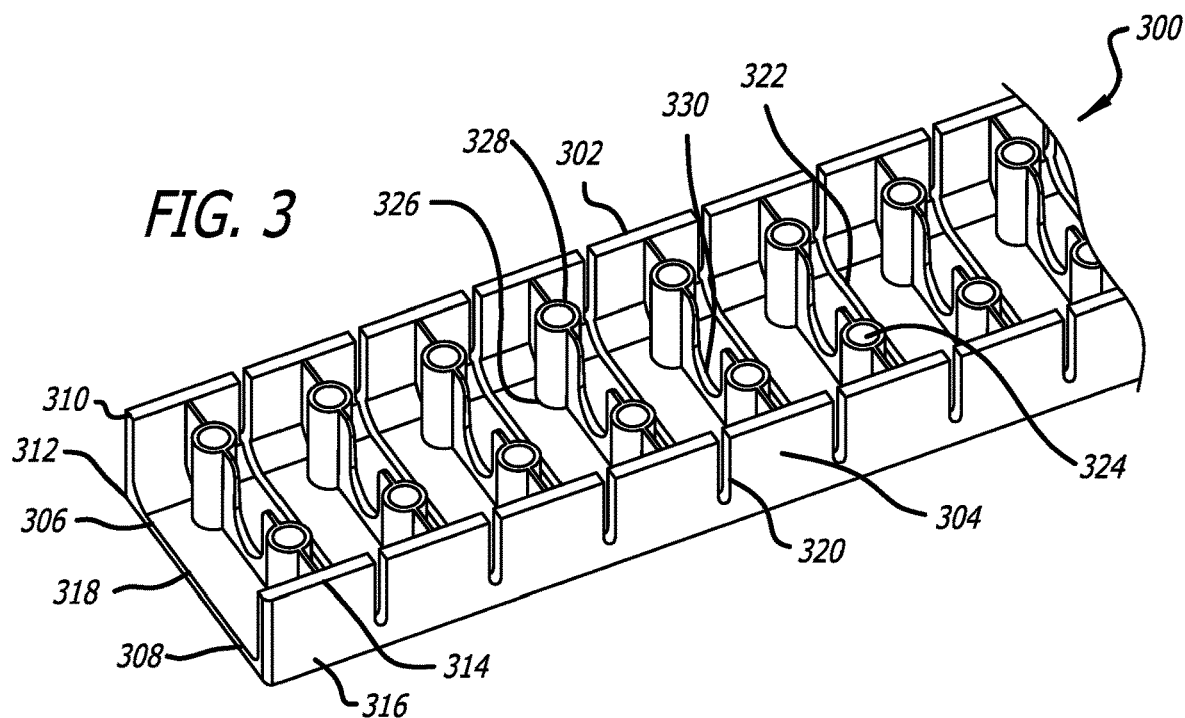
FIGS. 3-7 illustrate various views of a track filler, according various examples of the present disclosure.
Figure 4:
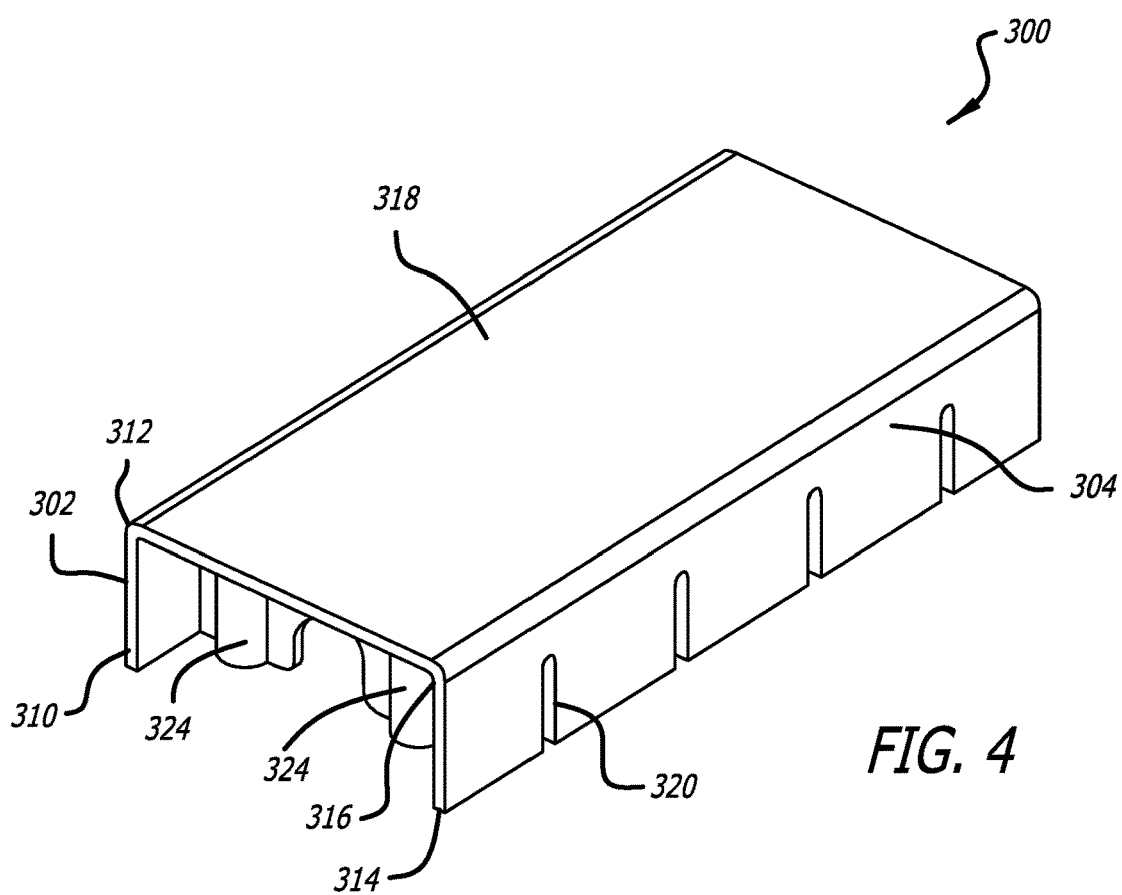
Figure 5:
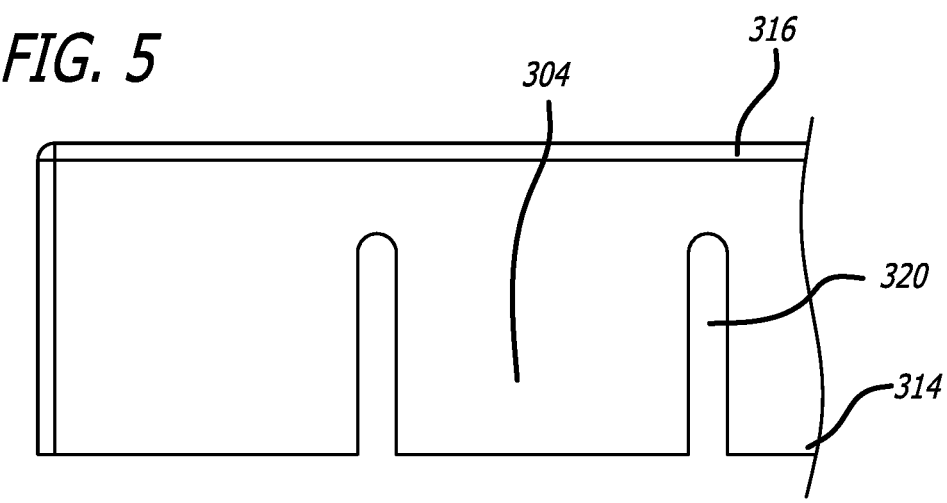
Figure 6:
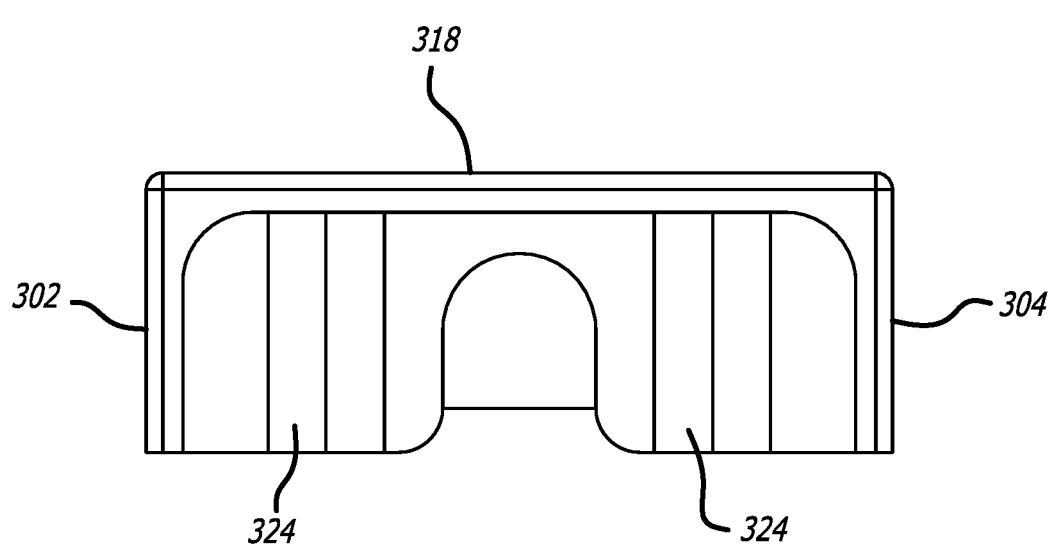
Figure 7:
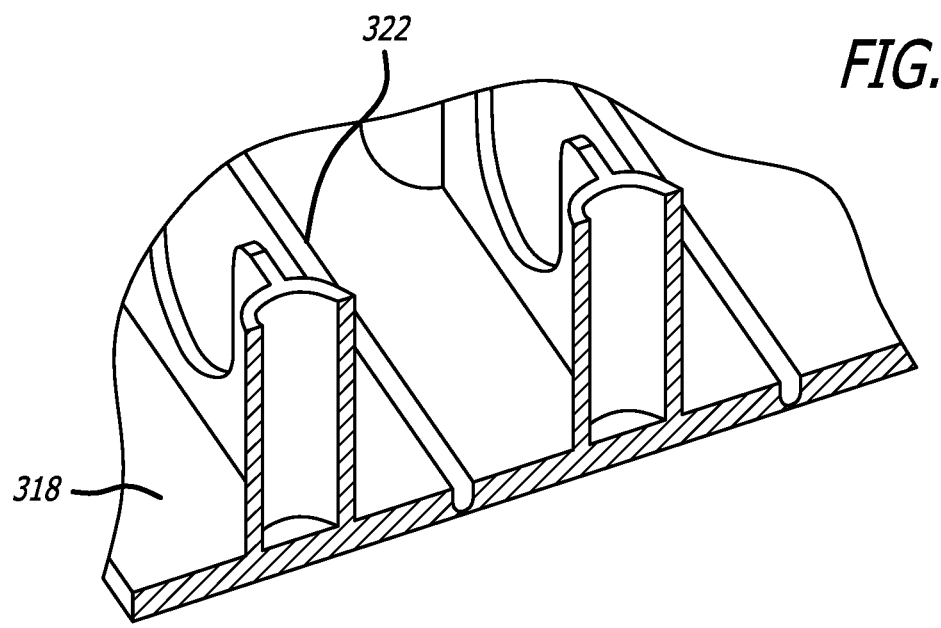

FIG. 2 illustrates a perspective view of an example of a track installed in an aircraft cabin. According to the example, the track 202 may be mounted on a sturdy surface such as a beam or a frame 208 within a floor panel 204 of the aircraft. As illustrated, the track 202 has space 210 for inserting the legs of the seats at desired locations within the cabin anywhere along the track 202. To avoid leaving empty spaces 210 along the unused portions of the track 202, a track filler 212 may be inserted and accommodated in the spaces 210. A carpet 206 may then be laid over a substantially smooth surface formed by the floor panel 204, the track 202, and the track filler 212.

In general, when manufacturing an aircraft cabin, the seats are installed in the track 202 according to design specifications and the remaining spaces are filled with the track filler 212. Thus, track fillers 212 of various lengths are used to fill the different sized spaces left between the seat legs and/or the bulkhead. For example, in some sections, the track filler 212 may be just one inch in length whereas in other areas, the track filler 212 may be 84 inches in length. Additionally, the track fillers 212 are generally made of relatively hard material to withstand people walking over them and/or rolling heavy objects over them, e.g., an aircraft service cart. In conventional manufacturing techniques, the track fillers 212 are cut to various sizes at the factory using heavy duty machinery. To support the manufactures' needs to install track fillers 212 of various lengths, for example, between about one inch and about 84 inches, a different part number is assigned to track fillers 212 of different lengths, and the stock room is stored with hundreds of track fillers 212 of different sizes. Thus, the installer has to determine the length needed and order the correctly sized track filler 212 using the correct part number to install them in the empty track spaces. In the event that the installer obtains the wrong size, one would have to go through the cumbersome process of reordering the correct size from the store room. If the correct size is not available in the store room, the correct size needs to be ordered from the supplier or the manufacturer. Therefore, a more efficient and less cumbersome technique for sizing and installing the track fillers 212 is needed.

Accordingly, the examples of the present disclosure provide improved track fillers and techniques for sizing the track fillers during the installation process by the installer on-the-spot on the aircraft without using any tools. FIGS. 3-8 illustrate various views of a track filler 300 according examples of the present disclosure.

Track filler 300 has an elongated body that may be shortened by a user, for example, an installer installing the track filler 300 on an aircraft. The elongated body has a first sidewall 302 formed along a first side 306 of the body, and a second sidewall 304 formed along a second side 308 of the body. The first sidewall 302 may have a first top end 312 and a first bottom end 310, and the second sidewall 304 may have a second top end 316 and a second bottom end 314. The first sidewall 302 and the second sidewall 304 may be joined by a topwall 318 coupling the first top end 312 and the second top end 316 together such that the first sidewall 302, the second sidewall 304, and the topwall 318 form a substantially U-shape, thus leaving the center or interior 115 portion formed by the first sidewall 302, the second sidewall 304, and the topwall 318 at least partially hollow or empty.

The first and second sidewalls 302, 304 have a plurality of periodic notches 320 formed along the first bottom end 310 of the first sidewall 302, and along the second bottom end 314 of the second sidewall 304. The notches 320 may be evenly spaced apart in a periodic manner, for example, every one-half inch. In other embodiments, the notches 320 may be spaced apart at other predetermined internals, for example, every one inch or every two inches. The notches 320 on the first sidewall 302 are aligned with the position of the notches on the second sidewall 304 such that the notches 320 are disposed directly opposite one another. In some examples, the notches 320 start at the first and second bottom ends 310, 314 and extend up along the first and second sidewalls 302, 304, respectively, toward the first and second top ends 312, 316. In some examples, the notches 320 extend up to about three-fourths of the way up the first and second sidewalls 302, 304. In other examples, the notches 320 may extend up all the way to the first and second top ends 312, 316 to where the first and second sidewalls 302, 304 intersect with the topwall 318. Yet in other examples, the notches 320 may extend up half-way between the first and second bottom ends 310, 314 and the first and second top ends 312, 316. Each of the notches 320 may be a gap in the sidewall, for example, a gap of about 0.1 inches.

Each of the notches 320 indicate a position along the elongated body that can be cut or shortened without using any tools, according to various examples of the present disclosure.

According to another example of the present disclosure, the interior side of the topwall 318 has a plurality of periodic grooves 322 that extend at least partially through the topwall 318. Each of the grooves forms a substantially straight line of groove that extends from the notch 320 at the first sidewall 302 to a corresponding notch 320 at the second sidewall 304, directly opposite the first sidewall 302. As shown in a close-up view in FIG. 7, the groove 322 forms an engineered failure point formed as a result of a thinned portion of the topwall 318 (e.g., a U-shaped or a V-shaped groove in the topwall 318) such that if the topwall 318 is folded or bent in a direction opposite the side containing the groove 322, the topwall 318 may break along the engineered failure point (e.g., a breaking plane) formed by the line of groove 322. The break may be a substantially clean break that may appear as if the track filler was cut with a machine even though no tools were used. Accordingly, the track filler 300 may be shortened to one of a plurality of predetermined lengths by breaking the elongated body along one of the grooves 322 and the notches 320.

According to another example of the present disclosure, the track filler 300 may include a plurality of support members 324 along the interior hollow portion of the body. The support member 324 may have a third top end 326 that is coupled or attached to the topwall 318 and a third bottom end 328 that extends outward from the topwall 318. The support member 324 may have a length that is approximately the same as the first and second sidewalls 302, 304 such that the third bottom end 328 aligns with the first and second bottom ends 310, 314 of the first and second sidewall 302, 304. Accordingly, the support members 324 are configured to support the topwall 318 of the elongated body when the track filler 300 is positioned in the track so that when a relatively heavy object is placed on the track filler 300, the topwall 318 does not warp or cave in.

In some examples, the track filler 300 may include one pair of support members 324 between two grooves 322. That is, each section between two grooves 322 may include two support member 324. Each of the support members 324 may be a cylindrical support member, but in other examples, the support members may have other shapes, such as square or other polygon shaped support members.

By way of example and not of limitation, the track filler 300 may be made of materials including, polypropylene with flame retardant, polycarbonate with flame retardant, polycarbonate copolymer with flame retardant, polyamide 6/6 with flame retardant, polyamide 6/6 with glass fiber and flame retardant, polyamide 12 with flame retardant, polyamide 12 with hollow glass microspheres and flame retardant, polyacrylamide (PA-MXD6) with glass fiber and flame retardant, polyurethane with flame retardant, polyetherimide, polyetherimide with glass fiber, polyetherimide blend, polysulfone, polyphenylsulfone, polyetheretherketone, polyetheretherketone with glass fiber, polyetherketoneketone, or polyvinylchloride with flame retardant. However, the track filler 300 may be made of other materials known to those having ordinary skill in the art. In some examples, the track filler 300 may be fabricated through injection molding techniques, additive manufacturing techniques, or other techniques known in the art.

In some examples, the interior of the of the body may have a channel 330 to allow cables to pass through the track filler 300. For example, aircraft seats may be connected to power cables to provide power for the seat recliner or in-flight entertainment systems. Such cables may be placed in the track and the track filler 300 may be disposed over it, thus covering and protecting the cables. The channels 330 within the track filler 300 may provide space for the cables within the track filler 300 without causing damage to the cables.

Figure 8:
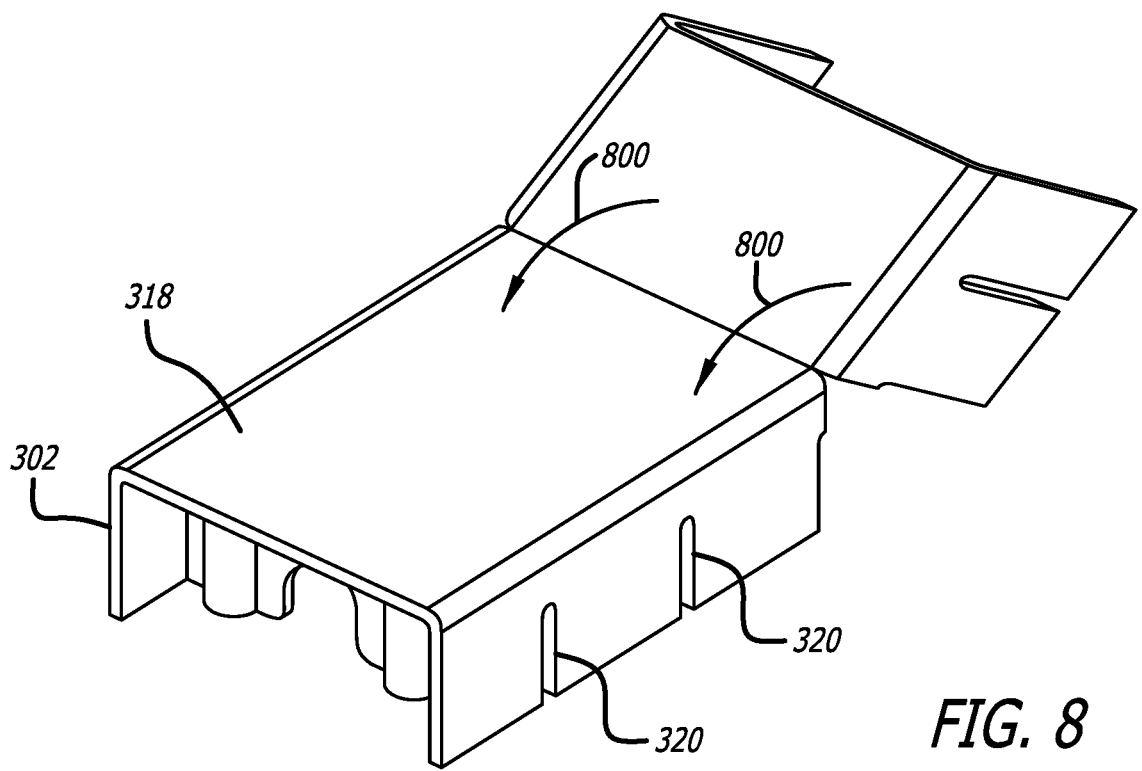
FIG. 8 illustrates a perspective view of the track filler being folded over to break the track filler along an engineered failure point, according to various examples of the present disclosure.

FIG. 8 illustrates a perspective view of the example track filler 300 being folded over to cause the track filler 300 to break along the groove 322 and the notches 320. As illustrated, the track filler 300 is bent or folded over by a person in a direction indicated by arrows 800. The person may simply grasp the track filler 300 with his or her hands and apply pressure to bend one end of the track filler 300 in the direction indicated by the arrows 800. In doing so, the first and second sidewalls 302, 304 begin to break at the notches 320 and the topwall 318 is folded along the groove 322. Because the groove 322 is a thinned portion of the topwall 318, the bending of the topwall 318 causes the topwall 318 to break along the groove 322. As such, the shortened portion of the track filler 300 may be inserted in to the track to fit specifically within the measured section of the track between, for example, two obstacles within the track (e.g., between two legs of the aircraft passenger seats).

Figure 9:
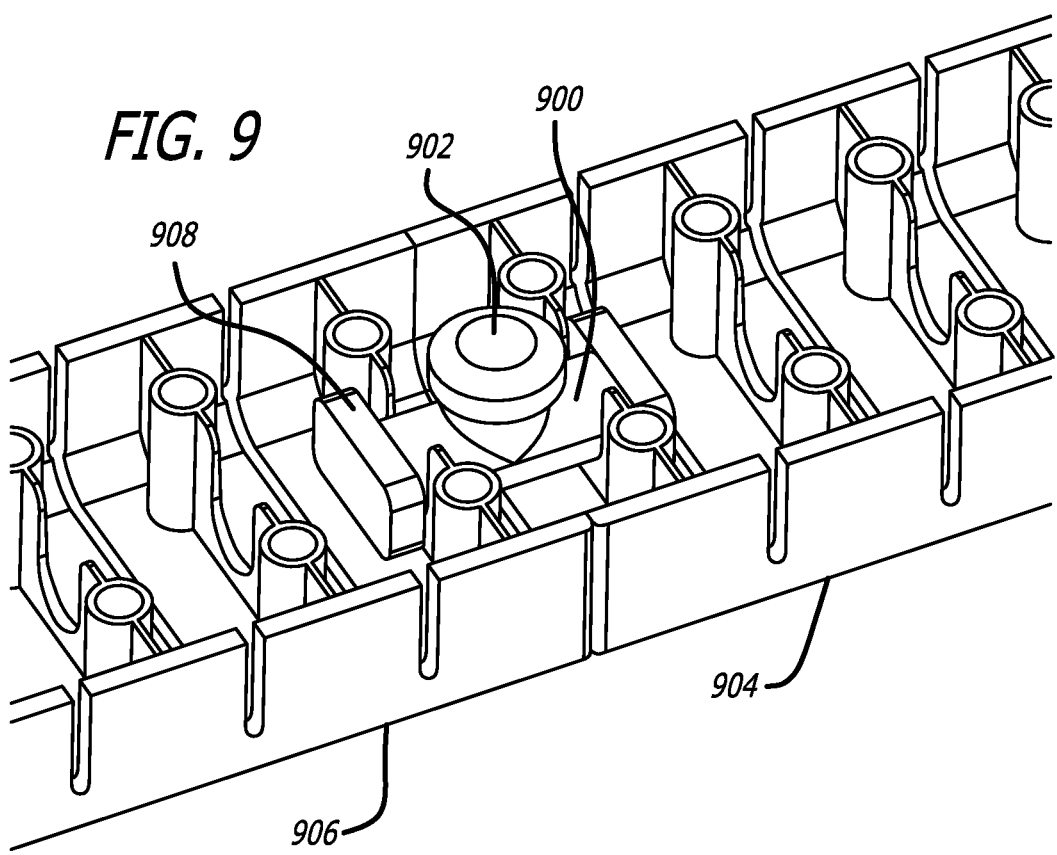
Figure 10:
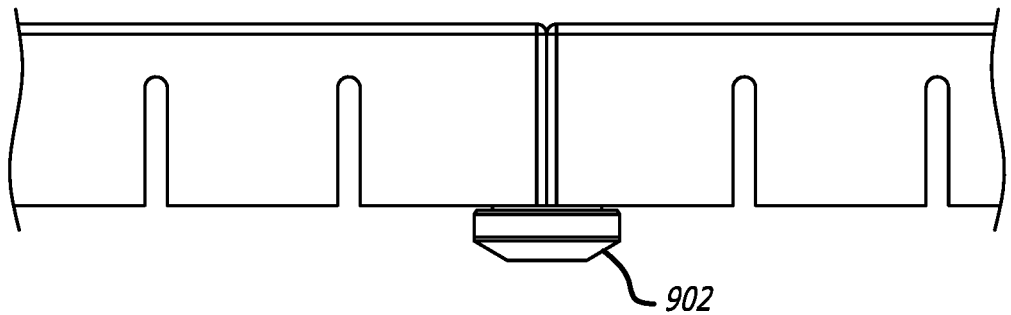

In some examples, a track filler may be coupled to another track filler to form a longer track filler. FIGS. 9-11 illustrate a first track filler 904 coupled to a second track filler 906 by an adapter 900 that is disposed between the first and the second track fillers 904, 906. According to the example, the adapter 900 may have a flange 908 on both ends of the adapter 900 so that it can hook on to portions of the support member 324 to hold the two track fillers 300 together and prevent them from separating. Accordingly, a longer track filler may be formed by coupling as many track fillers as desired. In some examples, the track filler may be coupled to a bulkhead or a locking mechanism at the end of the track to hold the track filler in place. In some examples, the adapter 900 may further have a non-slip gripping member 902. The gripping member 902 may be made of non-slip material such as, for example, rubber so that the track filler does not slide in the track once it is inserted. In some examples, the gripping member 902 may protrude from the first and second bottom ends 310, 314 of the first and second sidewalls 302, 304.

FIG. 12 is a flow chart of a method for installing the track filler 300 according to an example of the present disclosure. An installer may be a person such as a mechanic or a technician that manufacturers or assembles furniture and appliances in the passenger cabin of an aircraft. As the installer installs the passenger seats in the seat track on the floor, the unused sections of the track are filled with the track filler 300 as described in the present disclosure. The installer first determines a desired length of the track filler 300, for example, by measuring the length (1202). Based on the length of the track filler 300 needed, the installer determines which groove 322 from among the plurality of grooves he should break in order to end up with a track filler 300 that will fit in the selected portion of the track. The installer can select the groove 322 that is the closest to the desired length (1204). The installer can then bend the elongated body of the track filler 300 in a direction indicated by the arrows shown in FIG. 8, which is in a direction opposite the first and second sidewalls 302, 304 (1206). By bending the elongated body, the notches of the first and second sidewalls 302, 304 will break and the topwall 318 will also make a clean break along the groove 322 (1208). In some instances, the installer may bend the body back and forth until the topwall 318 eventually breaks, whereas in some instances, the topwall 318 may break after bending it just once. The shortened portion of the track filler 300 should now be approximately the desired measured length and may now be inserted in to the seat track (1210). The unused portion of the track filler 300 may either be discarded or used to further shorten to a length that is suitable for another section of the seat track. In some instances, the shortened track filler 300 may be coupled to another adjacent track filler 300 using an adapter disposed between the shortened track filler and the other track filler (1212). In other embodiments, the adapter may be coupled between the track filler 300 and anything that may be adjacent to the track filler 300, for example, a seat leg or a bulkhead. In this manner, the track filler 300 may be prevented from moving or sliding along the seat track.

As described in the present disclosure through various examples, installation of the track filler may be accomplished more efficiently by merely folding the track filler thereby causing it to break along an engineered failure point, all without the use of any tools. Therefore, the installer is able to adjust (e.g., shorten) the length of a longer track filler according to his or her needs on-the-spot, without relying on any tools to cut it, thus improving productivity.

It should be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the terms "substantially," "about," and similar terms are used as terms of approximation and not as terms of degree, and are intended to account for the inherent deviations in measured or calculated values that would be recognized by those of ordinary skill in the art.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments described herein are exemplary only. One skilled in the art may recognize various alternative embodiments from those specifically disclosed. Those alternative embodiments are also intended to be within the scope of this disclosure. As such, the embodiments are limited only by the following claims and their equivalents.

The invention claimed is:

1. A track filler adapted for use on an aircraft, the track filler comprising:
    an elongated body comprising:
        a first sidewall having a first top end and a first bottom end, and formed along a first side of the body;
        a second sidewall having a second top end and a second bottom end, and formed along a second side of the body, opposite the first sidewall; and
        a topwall joining the first top end and the second top end, wherein the body forms at least a partially hollow interior portion;
    a plurality of periodic notches along the first bottom end of the first sidewall and the second bottom end of the second sidewall and extending toward the first top end and the second top end, respectively;
    a plurality of periodic grooves extending partially through the topwall, wherein each of the grooves extend from a notch at the first top end to a corresponding notch at the second top end; and
    a plurality of support members attached to the topwall and at least one of the first sidewall or the second sidewall along the interior portion of the body,
    wherein the track filler is adapted to be installed in a seat track of the aircraft.

2. The track filler of claim 1, wherein each of the grooves form a line of thinned portions of the topwall.

3. The track filler of claim 1, wherein the periodic notches in the first sidewall, the periodic notches in the second sidewall, and the periodic grooves are aligned with one another such that the notches and the grooves form a breaking plane.

4. The track filler of claim 1, wherein the periodic notches of the first and second sidewalls extend from the first and second bottom ends and extend to about 75% of a distance between the first and second bottom ends and the first and second top ends.

5. The track filler of claim 1, wherein the elongated body forms a substantially U-shape by the first sidewall, the second sidewall, and the topwall.

6. The track filler of claim 1, the support members having a third top end coupled to the topwall and a third bottom end attached to and aligned with the first and second bottom ends, wherein pairs of the support members are disposed between corresponding pairs of the grooves, wherein a channel is defined between each of the pairs of the support members to allow one or more cables to pass through the track filler.

7. The track filler of claim 1, wherein the elongated body is configured to be shortened to one of a plurality of predetermined lengths by breaking the elongated body along one of the grooves.

8. The track filler of claim 7, wherein the elongated body comprises a first elongated body portion and a second elongated body portion, wherein the first elongated body portion is the shortened elongated body insertable in a track.

9. The track filler of claim 7, wherein the breaking of the elongated body along the groove is performed by bending, without using any tools, the elongated body in a direction opposite the first and second sidewalls.

10. The track filler of claim 7, wherein the predetermined length is in increments of about 0.5 inches.

11. A method for installing the track filler of claim 1 in the seat track, the method comprising:
    determining a desired length of the track filler based on the length of the seat track;
    selecting, from among the plurality of periodic grooves, a groove closest to the desired length of the track filler;
    bending, by a user, the elongated body in a first direction along the selected groove;
    breaking the elongated body at the notches of the first and second sidewalls and along the selected groove; and
    inserting the shortened track filler in the seat track.

12. The method of claim 11, wherein the breaking the elongated body is performed by the user without using any tools.

13. The method of claim 11, wherein each of the grooves form a line of thinned portions of the topwall.

14. The method of claim 11, further comprising coupling the shortened track filler with another shortened track filler with an adapter disposed between the shortened track filler and the other shortened track filler.

15. The method of claim 11, wherein the first direction is a direction opposite the first and second bottom ends.

16. The method of claim 11, wherein the periodic notches in the first sidewall, the periodic notches in the second sidewall, and the periodic grooves are aligned with one another such that the notches and the grooves form a breaking plane.

17. The method of claim 11, wherein the periodic notches of the first and second sidewalls extend from the first and second bottom ends and extend to about 75% of a distance between the first and second bottom ends and the first and second top ends.

18. An aircraft comprising:
    a seat track; and
    a track filler installed in the seat track, the track filler comprising:
        an elongated body comprising:
            a first sidewall having a first top end and a first bottom end, and formed along a first side of the body;
            a second sidewall having a second top end and a second bottom end, and formed along a second side of the body, opposite the first sidewall; and
            a topwall joining the first top end and the second top end, wherein the body forms at least a partially hollow interior portion;
        a plurality of periodic notches along the first bottom end of the first sidewall and the second bottom end of the second sidewall and extending toward the first top end and the second top end, respectively;
        a plurality of periodic grooves extending partially through the topwall, wherein each of the grooves extend from a notch at the first top end to a corresponding notch at the second top end; and
        a plurality of support members attached to the topwall and at least one of the first sidewall or the second sidewall along the interior portion of the body.

19. A method for installing the track filler in the seat track of the aircraft according to claim 18, the method comprising:
determining a desired length of the track filler based on the length of the seat track;
selecting, from among the plurality of periodic grooves, a groove closest to the desired length of the track filler;
bending, by a user, the elongated body in a first direction along the selected groove;
breaking the elongated body at the notches of the first and second sidewalls and along the selected groove; and
inserting the shortened track filler in the seat track.

20. A track filler, comprising: an elongated body comprising: a first sidewall having a first top end and a first bottom end, and formed along a first side of the body; a second sidewall having a second top end and a second bottom end, and formed along a second side of the body, opposite the first sidewall; and a topwall joining the first top end and the second top end, wherein the body forms at least a partially hollow interior portion; a plurality of periodic notches along the first bottom end of the first sidewall and the second bottom end of the second sidewall and extending toward the first top end and the second top end, respectively; a plurality of periodic grooves extending partially through the topwall, wherein each of the grooves extend from a notch at the first top end to a corresponding notch at the second top end; a plurality of support members attached to the topwall and at least one of the first sidewall or the second sidewall along the interior portion of the body; wherein the elongated body is configured to be shortened to one of a plurality of predetermined lengths by breaking the elongated body along one of the grooves; wherein the elongated body comprises a first elongated body portion and a second elongated body portion, wherein the first elongated body portion is the shortened elongated body insertable in a track; and further comprising an adapter positioned at least partially within the interior portion of the body to couple the first elongated body portion with the second elongated body portion, the adapter comprising a gripping member configured to prevent the track filler from sliding against a track when the track filler is installed in the track.

* * * * *